Patented Aug. 4, 1953

2,647,899

UNITED STATES PATENT OFFICE 2,647,899

METHYLATED PYRAZOLEANTHRONE-BENZANTHRONES

David I. Randall, Phillipsburg, N. J., assignor to General Aniline & Film Corporation, New York, N. Y., a corporation of Delaware No Drawing. Application March 8, 1949, Serial No. 80,313

1 Claim. (Cl. 260—275)

The present invention relates to chloromethylated and methylated pyrazoleanthrone-benzanthrones and the leuco esters thereof.

There is available on the market a product of the following structure:

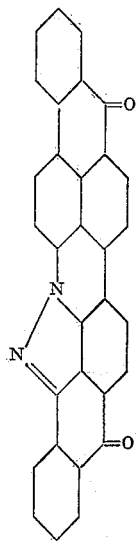

which is known as Indanthrene Navy Blue R. This product may be obtained by condensing pyrazoleanthrone with 4-bromobenzanthrone and ring closing the resulting condensation product.

This product has one deficiency and that is the tendency to undergo a very undesirable reddening when moistened with water, i. e., it is very susceptible to water spotting. Because of this deficiency, the use of the product has been greatly limited as a commercial dyestuff even though its other fastness properties are excellent.

Efforts have been made to improve the water spotting fastness of the involved compound by converting it into its di-bromo and di-chloro derivatives. Some improvement in the water spotting fastness is realized in this way and the di-halo derivatives also have the advantage that the introduction of the halogen atoms changes the shade to a more desirable blue. However, even the di-halo derivatives do not meet the requirements of the dyestuff art in so far as the water spotting fastness is concerned.

I have now discovered that products fast to water spotting and partaking of the other excellent fastness properties of Indanthrene Navy Blue R are obtained by introducing into Indanthrene Navy Blue R one or two chlormethyl or methyl groups. The improvement is particularly outstanding in the case of the di-chlormethyl and di-methyl derivatives which also exhibit surprising greenish-blue shades.

Chlormethyl and methyl derivatives of Indanthrene Navy Blue R and the preparation thereof, as well as the leuco sulfuric acid esters of such compounds, constitute the purposes and objects of the present invention.

The compounds contemplated herein may be represented by the following structure:

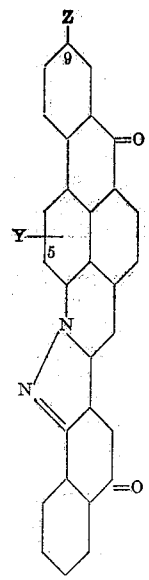

in which Z and Y are hydrogen, methyl or chlormethyl, Z and Y being the same when they are other than hydrogen, Y being other than hydrogen when Z is hydrogen, and Z being methyl when Y is hydrogen.

The particular position occupied by substituent Y has not been definitely ascertained. It appears, however, that this substituent enters the 5-position but since this has not been established, it is preferred to indicate the position of Y in the above manner.

The compounds involved may be made by different procedures. For instance, compounds in which Z is methyl and Y is hydrogen are obtained by condensing 9-chloromethyl-4-bromobenzanthrone with pyrazole anthrone in the presence of an acid binding agent such as potassium carbonate, sodium carbonate, and the like, and an inert diluent such as nitrobenzene or toluene and ring closing the resulting condensation product in a melt of potassium or sodium hydroxide containing an alcohol such as methanol or ethanol and maintained at a temperature from about 100 to 150° C.

Compounds in which Y is chloromethyl and Z is hydrogen are obtained by the treatment of Indanthrene Navy Blue R with dichloro dimethyl ether in concentrated sulfuric acid or sulfuric acid monohydrate at room temperature. By elevating the temperature to 50–70° C., the dichlormethyl derivatives, i. e., in which Z and Y are both chlormethyl, are obtained.

The monochlormethyl and di-chlormethyl derivatives may be converted to the monomethyl and dimethyl derivatives respectively by vatting the dyestuffs according to the usual procedure.

The dimethyl products may also be produced by condensing 4-bromo benzanthrone with pyrazole anthrone in the presence of an acid binding agent, di-chlormethylating the condensation product as above, and then ring closing in a melt of caustic.

Examples of compounds contemplated herein are:

9-methyl pyrazole anthrone-benzanthrone
$x$-Chloromethyl pyrazole anthrone-benzanthrone
$x$-9-dichloromethyl pyrazole anthrone-benzanthrone
$x$-9-dimethyl pyrazole anthrone-benzanthrone and the leuco sulfuric acid esters of these compounds. The letter $x$ in the nomenclature of the above compounds indicates that the positioning of a chloromethyl or a methyl group has not been definitely established.

The leuco sulfuric acid esters are produced according to conventional procedure, i. e., by heating the vat dye in an anhydrous medium comprising pyridine, the addition product of pyridine and sulfur trioxide, iron and a little cuprous chloride.

In connection with the chlormethylation outlined above, it is of importance to note that most aromatic amines are difficult or almost impossible to chloromethylate in this way. It appears that the compounds involved are amenable to chloromethylation by reason of the presence of the pyrazole ring which seems to stabilize the molecule sufficiently to allow the reaction to proceed.

The invention is further illustrated by the following examples, but it is to be understood that the invention is not restricted thereto.

*Example I*

17.0 grams of Indanthrene Navy Blue R were dissolved in 76 cc. of 96% sulfuric acid. At 25° C., 20 cc. of dichlorodimethyl ether are added. The temperature was held at 60° C. for 15 hours. After pouring into ice and water the bluish gray solid which precipitated was filtered off and washed neutral and dried. Weight 20.4 grams., chlorine calculated 12.9%, found 10.8%.

The product has the following probable formula:

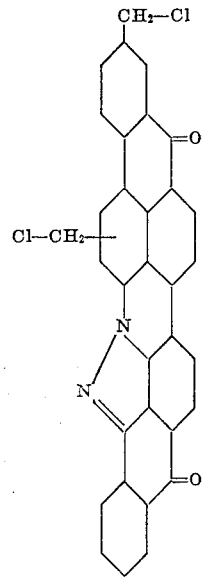

Dyeings of this compound showed a greenish blue shade fast to water spotting and of excellent fastness properties in general.

By vatting the dyestuff and isolating by first oxidizing with air and then filtering a dimethyl product is obtained which dyes very much stronger shades than does the dichloromethyl dyestuff. This product apparently has the following formula:

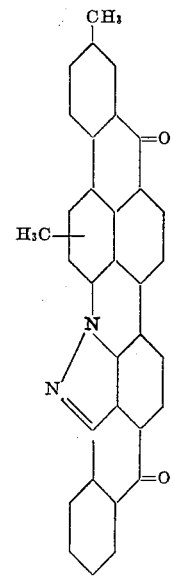

*Example II*

35.8 grams of 9-chloromethyl-4-bromobenzanthrone, 22.2 grams of pyrazoleanthrone, 20.0 grams of powdered calcined potassium carbonate and 250 cc. of nitrobenzene were heated at 205° C. for 8 hours.

The solution was cooled to 25° C. and filtered. By washing with alcohol the filter cake was freed of nitrobenzene. The precipitate was further washed with dilute HCl and then water.

To a melt of 250 grams of potassium hydroxide flakes in 286 cc. of 90% ethanol, 30.0 grams of the intermediate from above was added at 50° C. Ring closure was effected by keeping at 95–100° C. for 4 hours. The melt was poured into water oxidized with air and filtered.

Dyeings on cotton somewhat bluer than those from Indanthrene Navy Blue R were obtained and possessed excellent fastness properties.

*Example III*

20.0 grams of the condensation product from Example II were chloromethylated as in Example I. The caustic melt was performed as in Example II. Dyeings obtained by this procedure are similar to those of Example I.

*Example IV*

The chloromethylation of Example I was performed with the same reactants but at a temperature of 25° C. At this temperature only one chloromethyl group is introduced. The product was then vatted to convert the product to the monomethyl derivative according to Example I. A product was obtained which gave bluer dyeings having much better water spotting fastness than Indanthrene Navy Blue R. The water spotting fastness, however, was not equal to that of the product of Example I.

*Example V*

4-(pyrazoleanthranyl)-benzanthrone was chloromethylated as in Example I. Two chloromethyl groups were thus introduced, one in the 9-position and the other apparently in the 5-position. After caustic fusion as in Example II, a dimethyl derivative identical with that of Example I was obtained. The starting material was prepared by condensing 4-bromo-benzanthrone with pyrazoleanthrone in the presence of powdered calcined potassium carbonate and nitrobenzene at a temperature of 205° C.

*Example VI*

200 cc. of pyridine were cooled to 0° C. and 20 cc. of chlorosulfonic acid were added over a period of 10 minutes. The temperature was raised to 48° C. whereupon there were added 22.5 grams of the dimethyl derivative of Example I, 7 grams of iron by hydrogen, and .2 gram of cuprous chloride over a period of 6 minutes. The charge was agitated at 46–48° C. for 2 hours. Then 1.4 grams of iron by hydrogen were charged and agitation was continued at the above temperature for two additional hours. The pyridine was removed under reduced pressure and the diester salted out and recovered.

The dyeings obtained with the di-sulfuric acid ester are gray blue in color, having excellent fastness to water spotting, washing and light.

The 4-bromo-9-chloromethyl benzanthrone utilized in Example II is obtained by heating 4-bromo-benzanthrone dissolved in 96% sulfuric acid with dichloro dimethyl ether while adding the latter dropwise to the sulfuric acid solution of the 4-bromo-benzanthrone. The temperature after the addition is increased to 60° C. and held for 16 hours. A violet red solution results and this is poured into the ice and water from which a bright yellow solid precipitates. The solid is removed by filtration, washed free of acid and dried.

I claim:

A compound of the following formula:

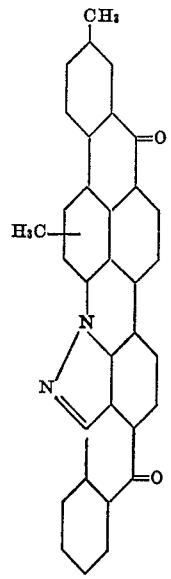

DAVID I. RANDALL.

References Cited in the file of this patent

UNITED STATES PATENTS

| Number | Name | Date |
|---|---|---|
| 1,790,780 | Wilke | Feb. 3, 1931 |
| 2,023,479 | Kunz et al. | Dec. 10, 1935 |
| 2,203,416 | Lycan | June 4, 1940 |